(12) United States Patent
Kotra et al.

(10) Patent No.: US 11,762,777 B2
(45) Date of Patent: Sep. 19, 2023

(54) METHOD AND APPARATUS FOR A DRAM CACHE TAG PREFETCHER

(71) Applicant: Advanced Micro Devices, Inc., Santa Clara, CA (US)

(72) Inventors: Jagadish B. Kotra, Austin, TX (US); Marko Scrbak, Austin, TX (US); Matthew Raymond Poremba, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 29 days.

(21) Appl. No.: 17/219,782

(22) Filed: Mar. 31, 2021

(65) Prior Publication Data
US 2022/0318151 A1 Oct. 6, 2022

(51) Int. Cl.
| | |
|---|---|
| *G06F 12/0891* | (2016.01) |
| *G06F 12/0853* | (2016.01) |
| *G06F 3/06* | (2006.01) |
| *G06F 12/0862* | (2016.01) |

(52) U.S. Cl.
CPC ........ *G06F 12/0891* (2013.01); *G06F 3/0614* (2013.01); *G06F 3/0659* (2013.01); *G06F 3/0679* (2013.01); *G06F 12/0853* (2013.01); *G06F 12/0862* (2013.01)

(58) Field of Classification Search
CPC .. G06F 12/0891; G06F 3/0614; G06F 3/0659; G06F 3/0679; G06F 12/0853; G06F 12/0862
See application file for complete search history.

(56) References Cited

U.S. PATENT DOCUMENTS

| | | | |
|---|---|---|---|
| 2003/0018857 A1 | 1/2003 | Anderson et al. | |
| 2005/0235115 A1 | 10/2005 | Franaszek et al. | |
| 2005/0235116 A1 | 10/2005 | Franaszek et al. | |
| 2007/0186048 A1* | 8/2007 | Nakanishi ........... | G06F 12/0862 711/137 |
| 2010/0262750 A1 | 10/2010 | Deshpande et al. | |
| 2011/0113199 A1* | 5/2011 | Tang ................... | G06F 15/8069 711/143 |
| 2014/0208035 A1* | 7/2014 | Novakovsky ....... | G06F 12/0855 711/130 |
| 2014/0297965 A1* | 10/2014 | Jayaseelan .......... | G06F 12/0862 711/137 |
| 2015/0234663 A1 | 8/2015 | Chishti et al. | |
| 2018/0239708 A1* | 8/2018 | Conway .............. | G06F 12/0888 |
| 2021/0182214 A1* | 6/2021 | Moyer ................ | G06F 12/0862 |
| 2021/0406184 A1* | 12/2021 | Mathur ............... | G06F 9/30047 |

* cited by examiner

*Primary Examiner* — Sean D Rossiter
(74) *Attorney, Agent, or Firm* — Volpe Koenig

(57) ABSTRACT

Devices and methods for cache prefetching are provided. A device is provided which comprises memory and a processor. The memory comprises a DRAM cache, a cache dedicated to the processor and one or more intermediate caches between the dedicated cache and the DRAM cache. The processor is configured to issue prefetch requests to prefetch data, issue data access requests to fetch the data and when one or more previously issued prefetch requests are determined to be inaccurate, issue a prefetch request to prefetch a tag, corresponding to the memory address of requested data in the DRAM cache. A tag look-up is performed at the DRAM cache without performing tag look-ups at the dedicated cache or the intermediate caches. The tag is prefetched from the DRAM cache without prefetching the requested data.

20 Claims, 4 Drawing Sheets

METHOD AND APPARATUS FOR A DRAM CACHE TAG PREFETCHER

BACKGROUND

Cache memory is used to accelerate access to data stored in a larger random access memory (RAM) portion (e.g., main memory) by storing copies of data in the cache that are frequently accessed in the larger (larger capacity), yet slower (longer access time) memory portion. When a processor requests access (e.g., read data from or write data to) to the larger memory portion (e.g., identified by an address), the processor first determines whether a copy of the data is stored in the cache. If it is determined that a copy of the data is stored in the cache, the processor accesses the cache, facilitating a more efficient accessing of the data.

BRIEF DESCRIPTION OF THE DRAWINGS

A more detailed understanding can be had from the following description, given by way of example in conjunction with the accompanying drawings wherein.

DETAILED DESCRIPTION

Figure 1:
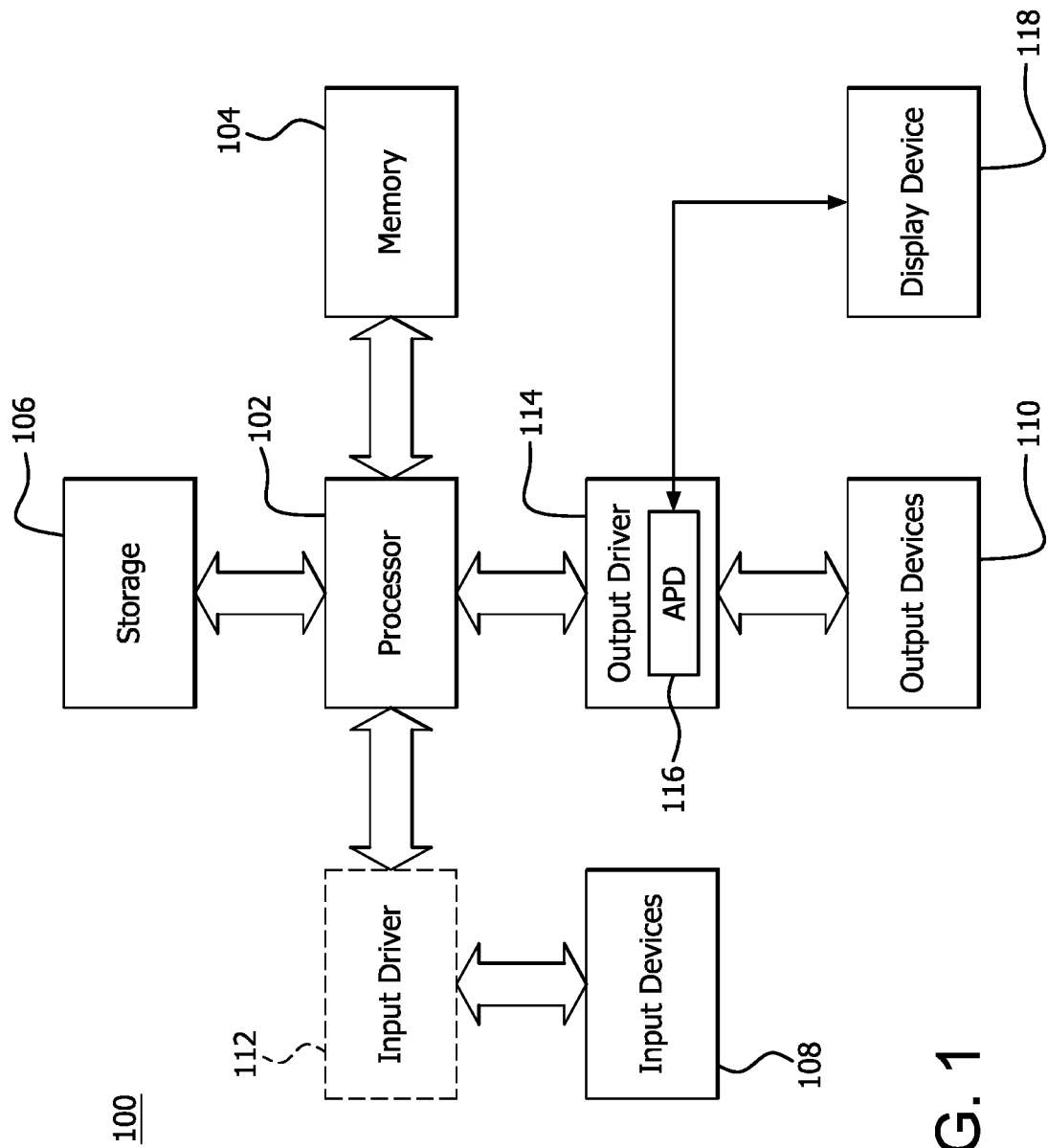
FIG. 1 is a block diagram of an example device in which one or more features of the disclosure can be implemented.

Frequently accessed data is copied from the larger, slower memory to a cache in blocks of fixed size, typically referred to as cache lines. When a cache line is copied to the cache, a cache entry is created (i.e., placed in the cache), which includes the copied data and a portion of the requested memory address (e.g., a tag). If a tag associated with a subsequent memory request matches the tag in the cache, a cache hit occurs and the data is accessed in the cache line. If the tags do not match, however, a cache miss occurs, a new entry is allocated to the cache, and data from the larger, slower memory is copied to the cache and accessed. Existing entries may be replaced (e.g., evicted) by new entries according to different mapping policies, which include direct mapping and associative mapping, as described in more detail below.

The main types of RAM include static random access memory (SRAM) and dynamic random-access memory (DRAM). SRAM is a faster memory (e.g., less time is incurred to access data) than DRAM, and therefore, is typically used as cache memory. DRAM is less expensive (e.g., consumes less power) than SRAM and offers a larger memory capacity and density than SRAM. Accordingly, DRAM is typically used as a larger, but slower (i.e., longer access time) portion of memory (e.g., main memory).

Because of the demand for increasing amounts of memory and performance, recent conventional approaches have been developed to use caches (e.g., DRAM caches) as a way to provide high capacity, high density cache storage for off-chip main memories. For example, these conventional approaches provide a larger (i.e., larger capacity) and slower (i.e., longer access time) portion of memory (e.g., non-volatile memory, such as main memory) along with a portion of cache memory (e.g., DRAM, high bandwidth memory, or other high performance memory), which is smaller and faster (i.e., shorter access time) than off-chip memory (e.g., main memory), but slower than SRAM.

Because the faster memory (e.g., DRAM) is acting as a cache for the slower memory, the data copied to the DRAM cache is tagged, as described above, to determine whether the requested data is located in the cache. In addition, the cache tags are typically stored within the DRAM cache due to infeasible area overhead for storing the tags in SRAM. Accordingly, when a request to access data is issued, it is determined whether the requested data is cached (e.g., in level 1 (L1) cache, in level 2 (L2) cache, in level 3 (L3) cache and in the DRAM cache) by checking whether the tag associated with the requested data matches a tag associated with data in the cache (e.g., in the DRAM cache). The tag checking is serialized with data accesses in set-associative DRAM caches, while tag checking can be done in parallel in SRAM caches. The serial tag and data lookup in DRAM caches results in additional latency and negatively affects overall performance.

Different cache mapping policies, such as direct mapping and associative mapping, can be used to reduce this latency. For example, when a direct mapping policy is used for the cache, each tag (i.e., memory address) is allocated to a particular portion (e.g., set index) of the cache. The mapping between memory and the cache is easily implemented because indices and offsets can be easily computed (e.g., with bit operators or simple arithmetic) and less power is consumed to place data in the cache because searching through many cache lines is avoided. Cache lines of a direct mapped cache can be repeatedly evicted, however, when many addresses are mapped to the same cache indices, despite the existence of unused cache lines. Accordingly, direct mapping is effective at reducing the overall cache hit latency, but it can result in an overall higher cache miss rate.

When a fully associative mapping policy is used, new entries can be copied to any cache location (e.g., address) and data can be placed anywhere in the cache which reduces conflict misses. Fully associative caches are very expensive to implement, however, because the entire address is used as the tag, which greatly increases the tag storage overhead.

In addition, the tags of each cache block in the cache must be checked because the data can be located at any cache line, which increases the power consumption, latency, and memory bandwidth. Accordingly, while associative caches have lower cache miss rates than direct mapped caches, they have increased hardware costs, power consumption, latency, and memory bandwidth usage than direct mapped caches.

When an N-way set associative mapping policy is used, each entry is allocated to a set containing N number of cache lines, where each line can hold the data from any tag. For set associative caches, the larger the N number of lines in an N-way set associative policy, the greater the associativity and the lower probability for cache misses. The increase in associativity, however, includes an increase in the N number of lines and a greater number of addresses to search, resulting in increased latency and power consumption.

Some conventional techniques include specialized hardware data structures in an attempt to minimize the latency associated with tag lookups (i.e., tag access latency). For example, some conventional techniques use predictors to predict whether requested data will result in a cache hit or cache miss. The use of predictors is constrained, however, by memory capacity and the amount of information that can be tracked, which limits overall performance. In addition, these conventional techniques do not provide adequate associativity along with an acceptable access latency.

Data prefetching is a technique used to improve performance (e.g., reduce data access latency) by fetching data from a slower memory, to be placed in faster memory, before the data is actually requested for execution. Efficient prefetching, however, relies on both accuracy and timeliness. A prefetch is accurate when the prefetched cache line has been fetched and used by the requestor (e.g., CPU core) before the cache line is evicted. A prefetch is timely when the data is fetched and stored in the cache before the data is actually requested and used for execution.

In conventional prefetching systems, when prefetching results in inaccuracies (i.e., the prefetched data from the cache is not requested for execution within a number of clock cycles or before the data is evicted from the cache), these conventional systems address the inaccuracy issues by reducing the number of prefetches or stopping the prefetching (e.g., turning off prefetchers). These approaches are not efficient, however, because inaccurate prefetches still offer non-zero hit rates.

Features of the present disclosure provide methods and apparatuses for reducing tag access latency by speculatively issuing tag prefetches, based on feedback information from previous prefetches, while efficiently maintaining bandwidth usage. Instead of turning off prefetchers or reducing the number of prefetches, tags are prefetched without prefetching the corresponding data. Accordingly, the prefetching bandwidth is spent on the tags and not the data, avoiding wasted bandwidth on data for prefetches determined to be inaccurate. In addition, the latency to fetch tags is reduced, resulting in a more efficient execution due to the reduced latency and energy consumption. Features of the present disclosure exploit the benefit of less cache misses from set associative caches without the increased latency resulting from conventional set associative caches by utilizing feedback indicating the accuracy of prefetches for a set-associative DRAM cache. When prefetches are determined to be inaccurate, prefetching, from a cache dedicated to the processor (e.g., L1 cache) and intermediate caches (e.g., L2 cache, L3 cache), is bypassed and the tag is prefetched from the DRAM cache without prefetching the data corresponding to the tag, which reduces the bandwidth used for inaccurate prefetching of data in the DRAM cache. In addition, mere prefetching of the tag (i.e., without prefetching of data) from the DRAM cache reduces the access latency for fetching the tags later from the DRAM cache if the data is actually requested for execution. The reduction of bandwidth and the reduction in DRAM access latency facilitates higher cache associativity and DRAM cache hit rates and improves the overall performance.

For simplified explanation purposes, the examples provided herein, describe speculatively issuing tag prefetches from a DRAM cache. Features of the present disclosure may be implemented, however, by speculative issuing tag prefetches from any other type of non-SRAM cache which is accessed faster than accessing off-chip memory (e.g., main memory).

A processing device is provided which comprises memory and a processor. The memory comprises a first cache. The processor is configured to issue prefetch requests to prefetch data, issue data access requests to fetch the data and when one or more previously issued prefetch requests are determined to be inaccurate, issue a tag prefetch request to prefetch a tag, corresponding to a memory address of requested data in the first cache, without prefetching the data from the first cache. The first cache is, for example, a dynamic random-access memory (DRAM) cache and the processing device further comprises a second cache dedicated to the processor and one or more intermediate caches between the second cache dedicated to the processor and the DRAM cache.

A method of cache prefetching is provided which comprises issuing prefetch requests to prefetch data, issuing data access requests to fetch the data and when one or more previously issued prefetch requests are determined to be inaccurate, issuing a tag prefetch request to prefetch a tag, corresponding to a memory address of requested data in the first cache, without prefetching the data from the first cache.

A non-transitory computer readable medium comprising instructions for causing a computer to execute a method of cache prefetching, the instructions comprising issuing prefetch requests to prefetch data, issuing data access requests to fetch the data and when one or more previously issued prefetch requests are determined to be inaccurate, issuing a tag prefetch request to prefetch a tag, corresponding to a memory address of requested data in the first cache, without prefetching the data from the first cache.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
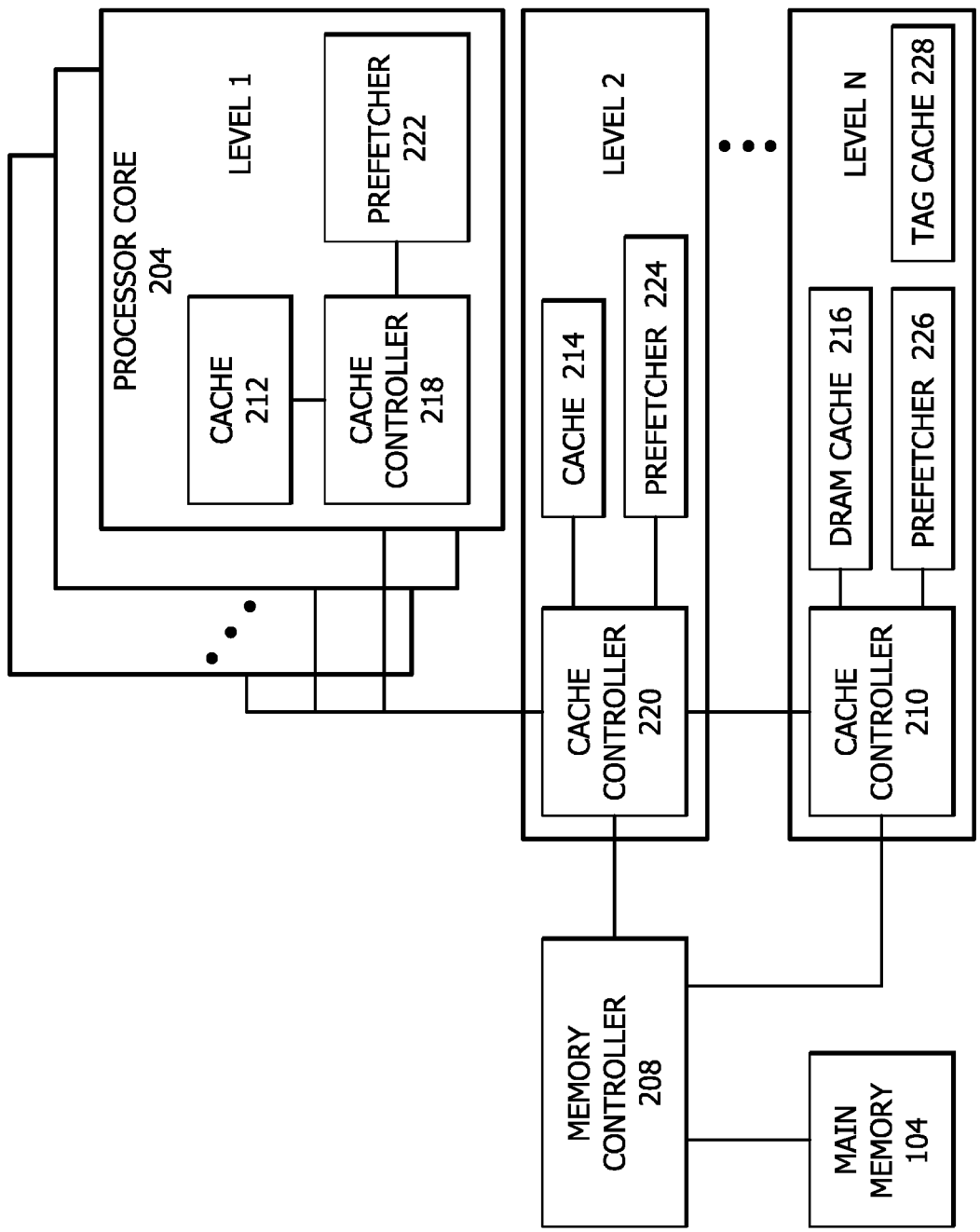
FIG. 2 is a block diagram illustrating example components for implementing one or more features of the disclosure.

FIG. 2 is a block diagram illustrating example components for implementing one or more features of the disclosure. The components shown in FIG. 2 are, for example, components of a processing device, such as device 100 shown in FIG. 1. As shown in FIG. 2, the components include memory 104 (e.g., main memory), processor cores 204, memory controller/processor 208, level 1 (L1) cache 212, level 2 (L2) cache 214 and level N (LN) DRAM cache 216, cache controllers 210, 218 and 220, prefetchers 222, 224 and 226 and tag cache 228.

The processor cores 204 are, for example, part of any processor type, such as a CPU or an accelerated processor (e.g., GPU).

L1 cache 212, L2 cache 214 and LN DRAM cache 216 are configured to implement a set associative mapping policy. Features of the disclosure can be implemented using caches on any number (N) of levels. For example, as shown in FIG. 2, components include a plurality of processor cores 204. Each core 204 includes a dedicated (not shared with other cores) L1 cache 212 and a L1 cache controller 218, in communication with a corresponding L1 cache 212, configured to process data using the corresponding L1 cache 212.

As shown in FIG. 2, components also include an L2 cache controller 220 in communication with level 2 cache 214 and configured to process data using L2 cache 214. L2 caches 214 are shared by the processor cores 204. Although not shown for simplified illustration purposes, devices can include any number of additional caches (e.g., L3 cache) in the cache hierarchy. For example, each L3 cache can be shared by a single processor (e.g., CPU or GPU) or a number of processor cores.

Each cache controller is in communication with the lower level cache controller and the next level cache controller. For example, for simplified illustration purposes, cache controller 220 is shown in communication with cache controller 218 and cache controller 210. Because any N levels can be used, however, it can be appreciated that cache controller 220 can be in communication with a level 3 cache controller (not shown). LN DRAM cache 216 and LN DRAM cache controller 210 can be in communication with and shared by caches of multiple processors, such as for example, caches of a CPU or GPU, which may be located on the same die, or multiple dies. In addition, although LN DRAM cache 216 is shown separate from main memory 104 in FIG. 2, level N DRAM cache 216 can be separate from or a part of main memory 104.

As further shown in FIG. 2, each level includes a prefetcher 222, 224 and 226. In some examples, one or more levels do not include their own dedicated prefetcher. Features of the present disclosure can be implemented with any number of prefetchers. Prefetchers can be implemented in hardware, software or a combination of hardware and software. For example, hardware based prefetching is typically implemented via a dedicated hardware mechanism, in communication with a corresponding cache, which dynamically monitors (at runtime without reliance on the compiler) instructions and data requested by the executing program, predicts next data to be requested and prefetches the data to the requesting processor's cache prior to the data actually being requested to execute the program. Software based prefetching is implemented, for example, by configuring the compiler to analyze instructions and insert additional prefetching instructions in the program when the program is compiled.

Memory controller/processor 208 is in communication with memory 104 (e.g., main memory) and cache controllers 220 and 218. As shown in FIG. 2, multiple clients 206 are in communication with memory controller/processor 208. Memory controller/processor 208 controls the flow of data to and from memory (e.g., memory 104, L1 cache 212, L2 cache 214 and LN cache 216). For example, when a request to access data from the memory is issued, the memory controller/processor 208 services the requests by reading from or writing to memory (e.g., accessing cache 212 via cache controller 218, cache 214 via cache controller 220, cache 216 via cache controller 210 and memory 104). Memory controller/processor 208 is configured to receive requests, allocate memory, control access to one or more caches and various other functions described herein. For example, as described in more detail below, memory controller/processor 208 is configured to issue prefetch requests for data, issue tag prefetch requests without data prefetching, issue data access requests to fetch the data, maintain or switch to operation in a first prefetching mode and a second prefetching mode based on a determined prefetching accuracy and a DRAM cache bandwidth usage.

Figure 3:
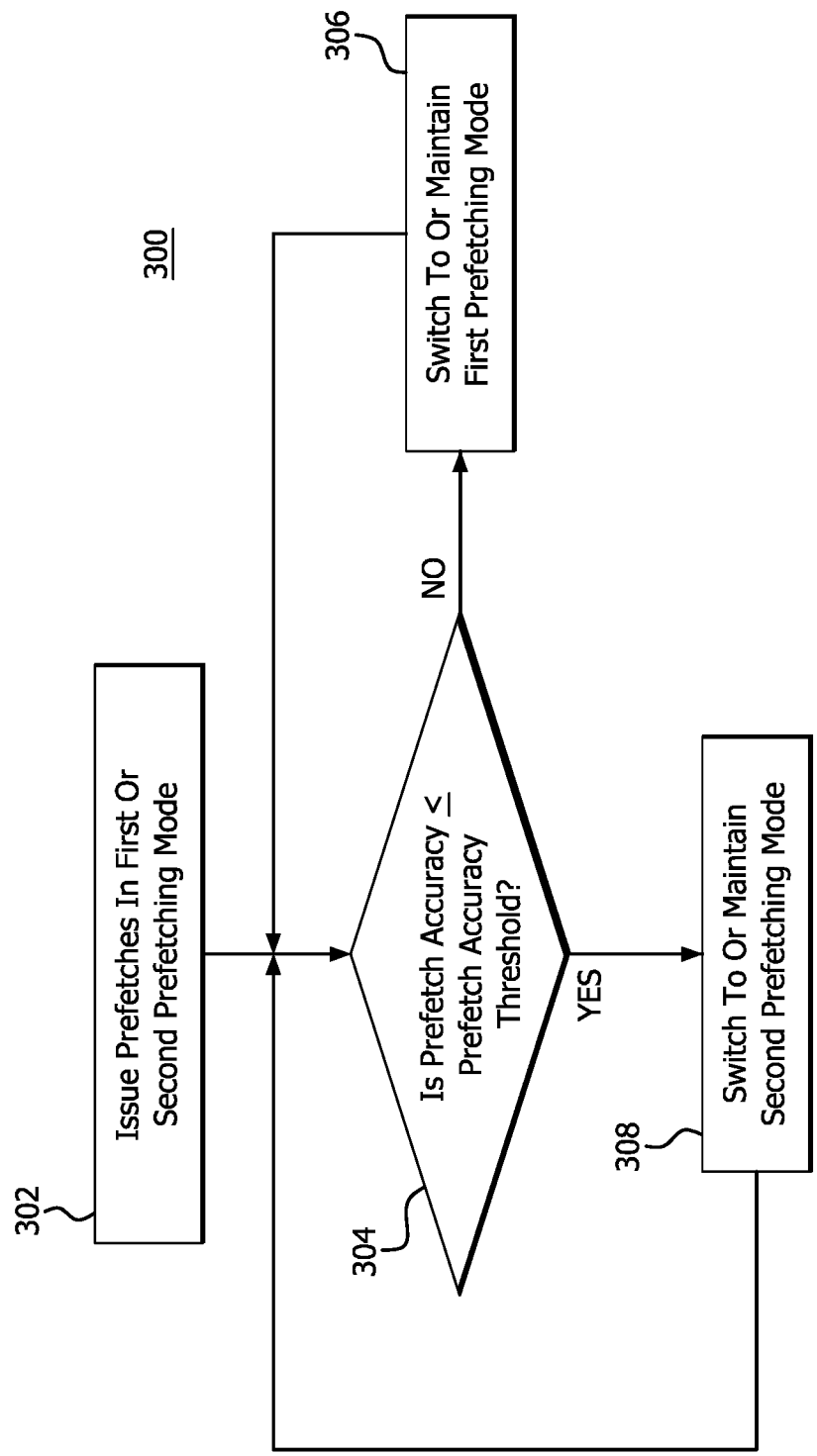
FIG. 3 is a flow diagram illustrating an example method of DRAM cache prefetching according to features of the present disclosure.

FIG. 3 is a flow diagram illustrating an example method of DRAM cache prefetching according to features of the present disclosure.

As shown at block 302, the method 300 includes issuing data prefetches according to one of a first prefetching mode and a second prefetching mode. For example, execution of an application begins (e.g., defaults) in either one of the first and second prefetching modes shown in FIG. 4A and FIG. 4B.

Figure 4A:
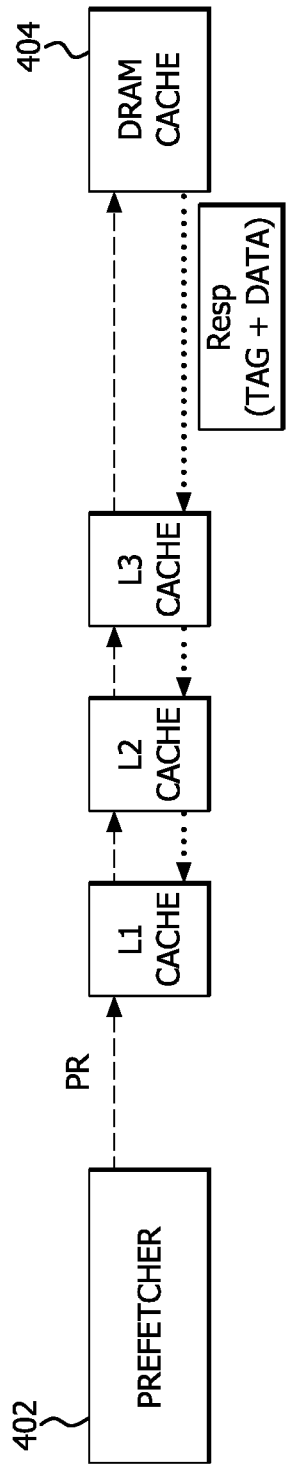
FIG. 4A is a block diagram illustrating an example flow for a first prefetching mode used for conditions of high prefetching accuracy according to features of the present disclosure.
Figure 4B:
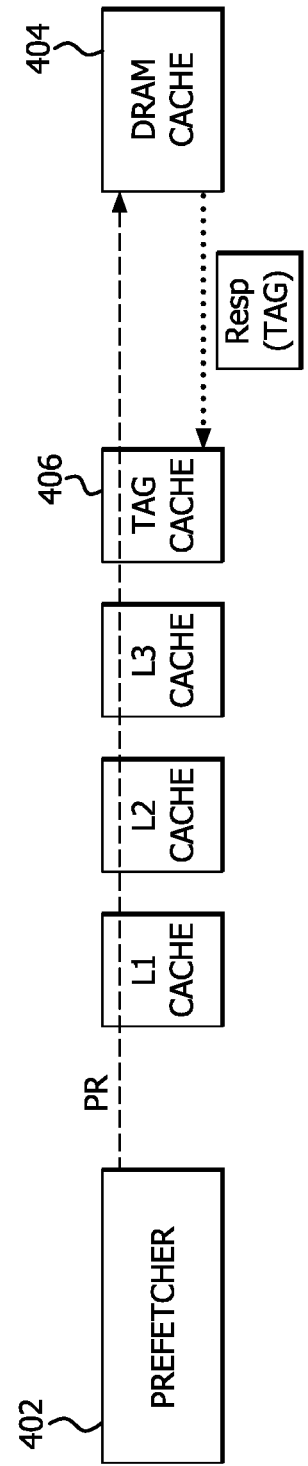
FIG. 4B is a block diagram illustrating an example flow for a second prefetching mode used for conditions of low prefetching accuracy according to features of the present disclosure.

FIGS. 4A and 4B are block diagrams illustrating two different prefetching modes according to features of the present disclosure. FIG. 4A illustrates a first prefetching mode used for conditions of high prefetching accuracy. FIG. 4B illustrates a second prefetching mode used for conditions of low prefetching accuracy.

Each level cache (e.g., L1 cache, L2 cache, L3 cache) can include a prefetcher which tries to predict next data to be accessed and issue prefetch requests for its corresponding cache prior to the memory access request for the predicted data. For simplified explanation purposes, however, the examples shown in FIG. 4A and FIG. 4B include a single prefetcher 402 for a processor core (e.g., prefetcher 222 in FIG. 2), which issues the prefetch requests (shown as PR in FIGS. 4A and 4B) upstream to higher level caches and the DRAM cache 404. In addition, although the examples shown in FIG. 4A and FIG. 4B include an L1 cache, an L2 cache and an L3 cache, features of the present disclosure can be implemented using any number of cache levels.

During operation in the first prefetching mode shown at FIG. 4A, tag look-ups are performed at the dedicated L1 cache and intermediate level caches (e.g., L2 and L3 caches) and both the tag and the data corresponding to the tag are prefetched from the dedicated L1 cache, the intermediate L2 and L3 caches or the DRAM cache 404 and returned to the requesting prefetcher 402.

For example, as shown in FIG. 4A, a prefetch is issued by prefetch requestor 402. L1 cache is checked to determine if the tag in the prefetch request is in the L1 cache. When the tag is determined to be in the L1 cache, the prefetch request is dropped because the tag is already in the lowest level cache. When the tag is determined not to be in the L1 cache, the L2 cache is checked to determine if the tag in the prefetch request is in the L2 cache. When the tag is determined to be in the L2 cache, the data is returned to the L1 cache and the tag and data are stored in the L1 cache. When the tag is determined not to be in the L2 cache, the L3 cache is checked to determine if the tag in the prefetch request is in the L3 cache. When the tag is determined to be in the L3 cache, the data is returned to the L2 cache and then to the L1 cache. The tag and data are stored in the L1 cache. The tag and data can also be stored in the L2 cache depending on the L2 cache allocation policy. When the tag and data are not in the L3 cache, the DRAM cache 404 is checked to determine if the prefetch request is in the corresponding cache. Both the tag and data are fetched from the DRAM cache 404 and, on a tag hit, the data is returned to the lower level caches (L3, L2, and L1) and the tag and data are stored in the L1 cache. The tag and data can also be stored in the L2 and L3 caches depending on the allocation policies of the L2 and L3 caches.

During operation in the second prefetching mode shown at FIG. 4B, the tag is prefetched from the DRAM cache 404 without prefetching the data corresponding to the tag, reducing the bandwidth used for inaccurate prefetching of data in the DRAM cache 404. That is, the tag prefetch request merely includes the physical address and metadata indicating the prefetch type. Additionally, or alternatively, tag look-ups are not performed (i.e., bypassed) at the L1, L2 and L3 caches. That is, the tag prefetch request is sent directly to the DRAM cache controller (e.g., cache controller 210 in FIG. 2) and bypasses the cache hierarchy. The tag prefetch request is received by the DRAM cache controller and stored in a separate queue (e.g., DRAM cache 216) for processing. The prefetched tag is placed in a tag cache along with the set metadata for easier consolidation of the tag cache and tags on future updates. The tag-prefetch queue is looked-up for incoming requests and all duplicate requests are squashed.

For example, as shown in FIG. 4B, when the prefetch request is issued by the prefetcher 402, the L1 cache, L2 cache and L3 cache are bypassed and a tag look-up is performed at the DRAM cache 404. When the tag in the prefetch request is in the DRAM cache 404, the tag is prefetched from the DRAM cache (e.g., by prefetcher 226 shown in FIG. 2) and placed in the tag cache 406 without prefetching the data corresponding to the tag. Accordingly, the prefetching bandwidth is spent on the tags and not the data, avoiding wasted bandwidth on data for prefetches determined to be inaccurate. In addition, the mere prefetching of the tag without prefetching the corresponding data from the DRAM cache 404 reduces the access latency for later fetching the tags from the DRAM cache if the data is actually requested for execution.

As shown at decision block 304, the method 300 includes determining whether the prefetch accuracy is equal to or less than a prefetch accuracy threshold. For example, a determination is made as to whether or not a number of previously issued prefetches have been fetched and used by the requestor (e.g., processor/controller of a CPU or GPU) before the cache line is evicted. The prefetch accuracy threshold is, for example, a ratio or percentage of inaccurate prefetches for a predetermined number of previously issued prefetches, a number of inaccurate prefetches over a predetermined number of clock cycles, a determination is made as to whether one or more previous prefetches are determined to be inaccurate When the prefetch accuracy is determined not to be equal to or less than the prefetch accuracy threshold (e.g., acceptable accuracy) at decision block 304 (i.e., NO decision in FIG. 3), the method includes switching to or maintaining operation in the first prefetching mode, as shown in block 306. That is, tag look-ups are performed for each cache (e.g., L1 cache, L2 cache, . . . DRAM cache) and both the tag and the data corresponding to the tag are prefetched from one of the caches and returned to the requesting prefetcher (e.g., prefetcher 402 in FIG. 4 or prefetcher 222 of processor core 204 in FIG. 2).

When the prefetch accuracy is determined to be equal to or less than the prefetch accuracy threshold at decision block 304 (i.e., YES decision in FIG. 3), the method includes switching to or maintaining operation in the second prefetching mode, as shown in block 308. That is, tag look-ups are not performed (i.e., bypassed) at the L1, L2 and L3 caches and tags are prefetched from the DRAM cache 404 without prefetching the data corresponding to the tags, reducing the bandwidth used for inaccurate prefetching of data in the DRAM cache 404.

In addition, during operation in the first prefetching mode, the prefetch accuracy continues to be monitored at block 304. Accordingly, when the prefetch accuracy is determined to be equal to or less than the prefetch accuracy threshold at decision block 304 (i.e., YES decision in FIG. 3), the prefetching mode switches from operation in the first prefetching mode to operation in the second prefetching mode.

Likewise, during operation in the second prefetching mode, the prefetch accuracy continues to be monitored at block 304. Accordingly, when the prefetch accuracy is determined to not be equal to or less than the prefetch accuracy threshold at decision block 304 (i.e., NO decision in FIG. 3), the prefetching mode switches from operation in the second prefetching mode to operation in the first prefetching mode.

In addition to prefetching tags from the DRAM cache 404 without prefetching the data, functionality of the prefetching can differ based on different types of prefetchers. For example, prefetchers, such as data stream prefetchers or direction prefetchers, can be binary throttled on and off based on the prefetch accuracy. That is, even when data prefetches are not being issued, tag prefetches are issued to the DRAM cache for all predicted future requested data streams.

Stride prefetchers can be distance throttled based on the prefetch accuracy. Accordingly, when the prefetch accuracy is determined to be equal to or less than the prefetch accuracy threshold, stride prefetchers can be configured prefetch the next stride instead of the next plurality of strides. Tag prefetches, without the data, are issued to DRAM cache for each stride when a stride prefetch accuracy is determined to be low.

Region-based prefetchers can be threshold throttled based on the prefetch accuracy. A region-based prefetchers is, for example, configured to monitor a miss map of recently accessed memory regions. For each data access request miss to a cache line, the region-based prefetcher updates a confidence counter for the tracked memory region. On a subsequent data access request miss, the region-based prefetcher issues prefetch requests merely to cache lines for a region which crossed a confidence threshold. Tag prefetches, without the data, are issued to DRAM cache for the region belonging to the last data access request miss.

For future data prefetches or demand requests, the tag cache is checked. When a tag cache hit occurs, the DRAM cache controller merely fetches the data from the DRAM cache. When a tag cache miss occurs, the data is fetched from the slower memory (e.g., main memory, storage-class memory). When cache line evictions and cache line fills occur, the tag cache is updated accordingly to prevent any inconsistencies between tags resident in the tag cache and tags residing in DRAM.

There is no bandwidth penalty for prefetching data for inaccurate prefetches and the hit latency is reduced for many accurate prefetches. Prefetch tags may slightly increase the memory bandwidth utilization. Accordingly, the DRAM bandwidth is continuously monitored such that the second prefetching mode is used when the bandwidth usage is greater than or equal to a memory bandwidth threshold (e.g., greater than or equal to 60% memory bandwidth usage) to prevent long DRAM queue delays for incoming demand requests.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, processor cores 204, memory controller 208, level 1 (L1) cache 212, level 2 (L2) cache 214 and level N (LN) DRAM cache 216 and 404, cache controllers 210, 218 and 220, prefetchers 222, 224, 226 and 402, and tag cache 228 and 406 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory comprising a first cache; and
   a processor configured to:
   issue prefetch requests to prefetch data;
   issue data access requests to fetch the data; and
   issue a tag prefetch request to prefetch a tag in response to one or more previously issued prefetch requests being inaccurate, wherein the tag prefetch request causes the tag, corresponding to a memory address of requested data in the first cache, to be prefetched without prefetching the requested data from the first cache.

2. The processing device of claim 1, wherein the first cache is a dynamic random-access memory (DRAM) cache and the processing device further comprises a second cache dedicated to the processor and one or more intermediate caches between the second cache dedicated to the processor and the DRAM cache, and
   when the one or more previously issued prefetch requests are determined to be inaccurate, a tag look-up is performed at the DRAM cache without performing tag look-ups at the cache dedicated to the processor or the one or more intermediate caches.

3. The processing device of claim 1, wherein the processor is configured to determine whether or not the one or more previously issued prefetch requests are inaccurate based on a comparison to a prefetch accuracy threshold.

4. The processing device of claim 1, wherein the processor is configured to:
   operate in a first prefetching mode in which tag look-ups are performed at a cache dedicated to the processor and one or more intermediate caches between the cache dedicated to the processor and the first cache, and the requested data is prefetched when the one or more previously issued prefetch requests are determined to be accurate; and
   operate in a second prefetching mode in which the tag is prefetched from the first cache without prefetching the requested data and without performing the tag look-ups at the cache dedicated to the processor and the one or more intermediate caches when the one or more previously issued prefetch requests are determined to be inaccurate.

5. The processing device of claim 4, wherein, based on whether or not the one or more previously issued prefetch requests are determined to be accurate, the processor is configured to perform one of:
   maintaining operation of one of the first and second prefetching modes; and switching operation from one of the first and second prefetching modes to another of the first and second prefetching modes.

6. The processing device of claim 4, wherein, during operation in one of the first prefetching mode and the second prefetching mode, the processor is configured to continue to monitor a prefetch accuracy of one or more issued prefetch requests.

7. The processing device of claim 1, wherein the processor is configured to monitor a first cache bandwidth such that the tag is prefetched from the first cache without prefetching the requested data when a first cache bandwidth usage is greater than or equal to a memory bandwidth threshold.

8. The processing device of claim 1, further comprising a tag cache,
wherein, when the tag in the tag prefetch request is in the first cache, the processor is configured to prefetch the tag from the first cache and place the tag in the tag cache without prefetching the requested data corresponding to the tag.

9. The processing device of claim 8, wherein, for a next prefetch request, the processor is configured to:
determine whether a next requested tag is in the tag cache;
prefetch, from the first cache, data corresponding to the next requested tag when it is determined that the next requested tag is in the tag cache; and
prefetch data from main memory when it is determined that the next requested tag is in not in the tag cache.

10. A method of cache prefetching comprising:
issuing prefetch requests to prefetch data;
issuing data access requests to fetch the data; and
issuing a tag prefetch request to prefetch a tag in response to one or more previously issued prefetch requests being inaccurate, wherein the tag prefetch request causes the tag, corresponding to a memory address of requested data in a first cache, to be prefetched without prefetching the requested data from the first cache.

11. The method of claim 10, wherein the first cache is a dynamic random-access memory (DRAM) cache, and
when the one or more previously issued prefetch requests are determined to be inaccurate, a tag look-up is performed at the DRAM cache without performing tag look-ups at a second cache dedicated to a processor issuing the prefetch requests or one or more intermediate caches between the second cache dedicated to the processor and the DRAM cache.

12. The method of claim 10, further comprising determining whether or not the one or more previously issued prefetch requests are inaccurate based on a comparison to a prefetch accuracy threshold.

13. The method of claim 10, further comprising:
operating in a first prefetching mode in which tag look-ups are performed at a cache dedicated to a processor issuing the prefetch requests and one or more intermediate caches between the cache dedicated to the processor and the first cache, and the requested data is prefetched when the one or more previously issued prefetch requests are determined to be accurate; and
operating in a second prefetching mode in which the tag is prefetched from the first cache without prefetching the requested data and without performing the tag look-ups at the cache dedicated to the processor and the one or more intermediate caches when the one or more previously issued prefetch requests are determined to be inaccurate.

14. The method of claim 13, further comprising performing, based on whether or not the one or more previously issued prefetch requests are determined to be accurate, one of:
maintaining operation of one of the first and second prefetching modes; and
switching operation from one of the first and second prefetching modes to another of the first and second prefetching modes.

15. The method of claim 13, further comprising, during operation in one of the first prefetching mode and the second prefetching mode, continuing to monitor a prefetch accuracy of one or more issued prefetch requests.

16. The method of claim 10, further comprising monitoring a first cache bandwidth such that the tag is prefetched from the first cache without prefetching the requested data when a first cache bandwidth usage is greater than or equal to a memory bandwidth threshold.

17. The method of claim 10, wherein when the tag in the tag prefetch request is in the first cache, the tag is prefetched from the first cache and placed in a tag cache without prefetching the requested data corresponding to the tag.

18. The method of claim 17, further comprising, for a next prefetch request: determining whether a next requested tag is in the tag cache;
prefetching data corresponding to the next requested tag from the first cache when it is determined that the next requested tag is in the tag cache; and
prefetching data from main memory when it is determined that the next requested tag is in not in the tag cache.

19. A non-transitory computer readable medium comprising instructions for causing a computer to execute a method of cache prefetching, the method comprising:
issuing prefetch requests to prefetch data;
issuing data access requests to fetch the data; and
issuing a tag prefetch request to prefetch a tag in response to one or more previously issued prefetch requests being inaccurate, wherein the tag prefetch request causes the tag, corresponding to a memory address of requested data in a first cache, to be prefetched without prefetching the requested data from the first cache.

20. The non-transitory computer readable medium of claim 19, wherein the first cache is a dynamic random-access memory (DRAM) cache, and
when the one or more previously issued prefetch requests are determined to be inaccurate, a tag look-up is performed at the DRAM cache without performing tag look-ups at a second cache dedicated to a processor issuing the prefetch requests or one or more intermediate caches between the second cache dedicated to the processor and the DRAM cache.

* * * * *